US011876462B1

(12) United States Patent
Eckerdt

(10) Patent No.: US 11,876,462 B1
(45) Date of Patent: Jan. 16, 2024

(54) METHODS FOR STORING HARVESTABLE ENERGY WITH EXCESS OR UNUTILIZED ENERGY AND SYSTEMS THEREOF

(71) Applicant: KEY SYSTEMS, INC., Fishers, NY (US)

(72) Inventor: George Eckerdt, Victor, NY (US)

(73) Assignee: KEY SYSTEMS, INC., Fishers, NY (US)

( * ) Notice: Subject to any disclaimer, the term of this patent is extended or adjusted under 35 U.S.C. 154(b) by 0 days.

(21) Appl. No.: 17/894,713

(22) Filed: Aug. 24, 2022

(51) Int. Cl.
*H02N 11/00* (2006.01)

(52) U.S. Cl.
CPC .................................. *H02N 11/002* (2013.01)

(58) Field of Classification Search
CPC .................................................... H02N 11/002
See application file for complete search history.

(56) References Cited

U.S. PATENT DOCUMENTS

| | | | | |
|---|---|---|---|---|
| 4,781,029 A * | 11/1988 | SerVaas | ...................... | F03G 7/05 60/648 |
| 8,097,218 B1 * | 1/2012 | Manaugh | ................ | F03B 13/26 136/246 |
| 9,045,209 B2 * | 6/2015 | Zeren | ........................ | F04F 5/00 |
| 2012/0061973 A1 * | 3/2012 | Zelony | ...................... | F03D 9/17 290/1 R |
| 2014/0261132 A1 * | 9/2014 | Zeren | ........................ | F17C 9/04 417/151 |
| 2014/0353974 A1 * | 12/2014 | Chen | ..................... | F03B 13/142 290/53 |
| 2015/0033717 A1 * | 2/2015 | Hsu | ........................ | F03B 17/02 60/325 |

FOREIGN PATENT DOCUMENTS

| | | | |
|---|---|---|---|
| CN | 102192077 A | * | 9/2011 |
| KR | 2011010854 A | * | 2/2011 |

* cited by examiner

*Primary Examiner* — Jared Fureman
*Assistant Examiner* — Michael J Warmflash
(74) *Attorney, Agent, or Firm* — Troutman Pepper Hamilton Sanders LLP (Rochester)

(57) ABSTRACT

A method for storing new harvestable energy with excess or unutilized energy includes providing an object configured to be transitioned between at least a depleted energy state and a stored energy state. Obtained excess or unutilized energy which is utilized to transition the object to the stored energy state. At least a portion of this stored energy is harvested for use when the object is released from the stored energy state and transitions towards the depleted energy state.

20 Claims, 3 Drawing Sheets

US 11,876,462 B1

METHODS FOR STORING HARVESTABLE ENERGY WITH EXCESS OR UNUTILIZED ENERGY AND SYSTEMS THEREOF

FIELD

This technology relates to methods and systems that store new harvestable energy with excess or unutilized energy.

BACKGROUND

Energy requirement demands throughout the world continue to grow and expand at a rapid pace. Unfortunately, existing fossil fuels as well as ongoing advancements with renewable energy sources are struggling to keep up with this demand. As a result, there is a tremendous need for additional new approaches for storing and generating new energy to satisfy ongoing and future energy requirement demands.

SUMMARY

A method for storing new harvestable energy with excess or unutilized energy includes providing an object configured to be transitioned between at least a depleted energy state and a stored energy state. Obtained excess or unutilized energy is utilized to transition the object to the stored energy state. At least a portion of this stored energy is harvested for use when the object is released from the stored energy state and transitions towards the depleted energy state.

An energy harvesting system includes an object configured to be transitioned between at least a depleted energy state and a stored energy state. A power system is configured to utilize obtained excess or unutilized energy to transition the object to the stored energy state to store energy. An energy harvesting system is configured to harvest and provide at least a portion of this stored energy when the object is released from the stored energy state and transitions towards the depleted energy state.

This technology provides a number of advantages including providing efficient and effective methods and systems that store new harvestable energy with excess or unutilized energy. Accordingly, examples of this technology recognize that power systems, such as solar power system, wind power systems, and/or a power grid have excess or unutilized energy above what is required for current energy demands on the power system that would otherwise be wasted and are able to identify and repurpose this excess or unutilized energy into a stored energy state for subsequent harvesting. Additionally, examples of this technology are highly efficient and scalable as well as being adaptable to a number of different types of environments, including water-based environments. Further, examples of this technology provide an effective green energy source which can store energy without batteries or other chemical exchange systems.

DETAILED DESCRIPTION

Figure 1:
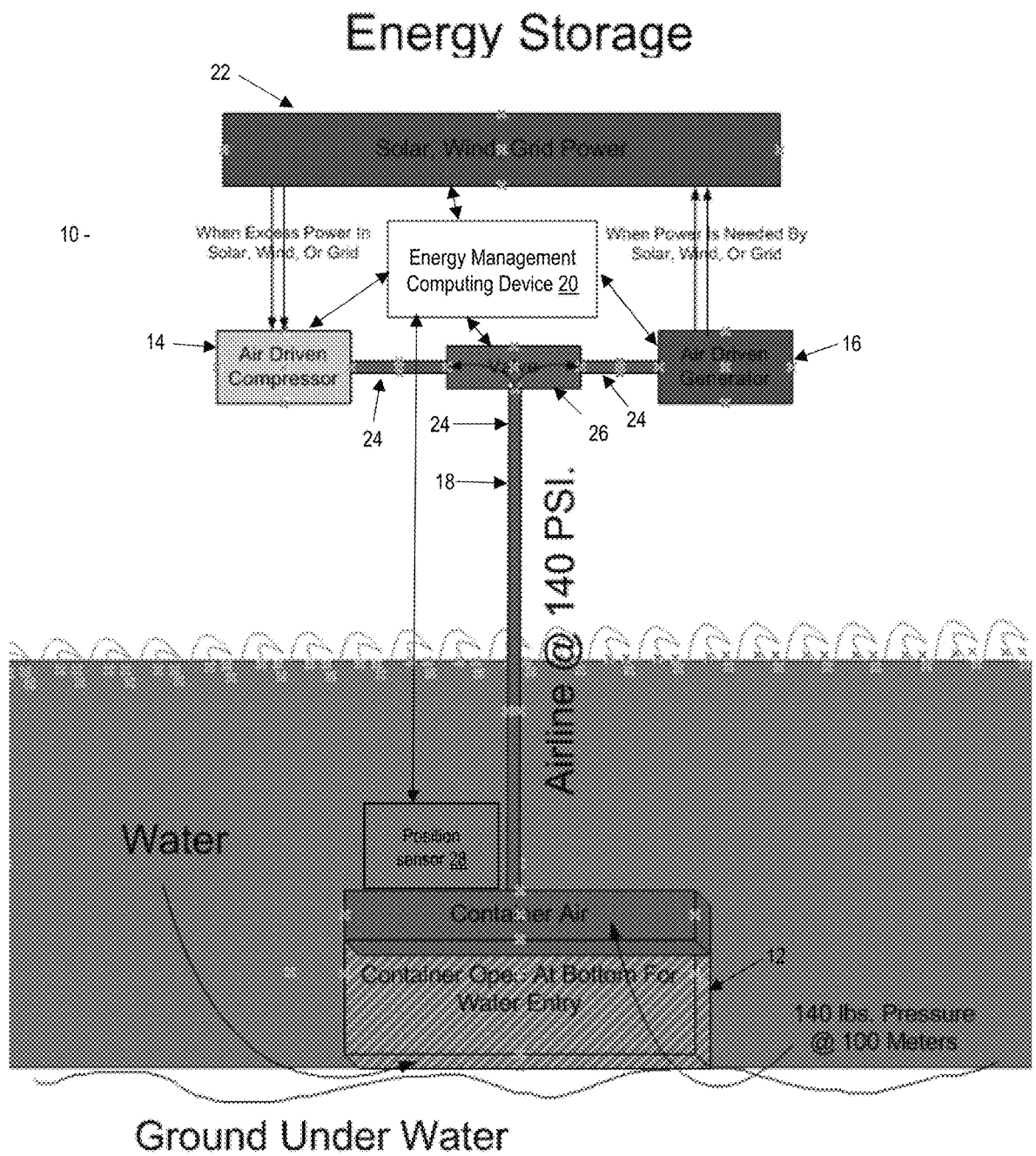
FIG. 1 is a diagram of an example of a water-based energy storage and harvesting system.

An environment with an exemplary water-based energy storage and harvesting system 10 is illustrated in FIG. 1, although this technology can be configured for use in other types of environments. In this example, water-based energy storage and harvesting system includes a container 12, an air-driven compressor system 14, an air-driven generator system 16, a hose system 18, and an energy management computing device 20, although other types of energy harvesting systems with other types and/or numbers of other systems, devices, components, and/or other elements in other configurations may be used. This technology provides a number of advantages including providing unique methods and systems for harvesting new energy with excess or unutilized energy, such as solar power from a solar power system, wind power from a wind power system, or excess power from a power grid by way of example.

Referring more specifically to FIG. 1, in this example the container 12 is about 1,000 ft. long, 100 ft. wide, and 100 ft. tall (similar in size to a large cruise ship), has a buoyancy of 639,886,757 lbs. if fully sunk, and a volume of 10,000,000 cu. ft., although other types of containers with other shapes, dimensions, and/or volumes may be used. Additionally, in this example, in a water-based environment, the container 12 needs to be heavy enough to prevent the container 12 from raising to the surface of the water at any given depth. Further, in this example, the bottom of the container 12 with respect to the water surface is open to allow water in and out as needed as described by way of the examples herein, although the container could have other configurations.

The container 12 may further comprise a position sensor 28 which may have a wireless or wired coupling to the energy management computing device 20, although other types and/or numbers of sensors and/or other manners for determining a position or current state of the container may be used. The position sensor 28 may be configured to provide a position signal of the container 12 in the water-based environment which can be correlated to a current state at or between the stored energy state and the depleted energy state.

The air-driven compressor system 14 is positioned on a floating platform (not shown) or other support structure on or above or away from the surface of the water in this water-based environment, although other types of systems in other configurations may be used in other types of environments. In this example, the air-driven compressor system 14 includes a plurality of air-driven compressors which are each capable of pumping at 150 psi individually, although other types and/or numbers of compressors, components, and/or other elements in other configurations may be used. Each of the compressors in the air-driven compressor system 14 is coupled to the energy management computing device 20, although each of the compressors could be controlled in other manners, such as with a controller built into each compressor by way of example. The energy management computing device 20 is configured to turn each of the compressors in the air-driven compressor system 14 on or off to fill the container 12 with air or another fluid to move towards a stored energy state depending on the amount of excess or unutilized power available from the power source 22, such as a solar power system, a wind power system, and/or a power grid in this example, although other manners for controlling the operation of one or more of the compressors may be used.

The air-driven generator system 16 is also positioned on the floating platform (not shown) or other support structure on or above the surface of the water in this water-based environment, although other types of systems in other configurations may be used in other types of environments. In this example, the air-driven generator system 16 includes a plurality of air-driven generators which are each capable of generating energy from air released from the container 12, although other types and/or numbers of generators, components, and/or other elements in other configurations may be used may be used. Each of the air-driven generators in the air-driven generator system 16 is coupled to the energy management computing device 20 to manage generation and delivery of energy to the power system 22, although each of the generators could be controlled in other manners, such as with a controller built into each generator by way of example.

The hose system 18 comprises a plurality of air hoses 24, valves 26, and other connectors to manage the flow of air or other fluids between the air-driven compressor system 14, the air-driven generator system 16, and the container 12, although other types of connection systems in other configurations may be used. The position of each of the valves 26 is managed by the energy management computing device 20 which provides signals to adjust one or more of the valves 26 to: enable air to flow from the air-driven compressors in the air-driven compressor system 14 to the container 12 while restricting air flow to one or more of the air-driven generators in the air-driven generator system 16; or restrict air to flow from one or more of the air-driven compressors in the air-driven compressor system 14 to the container 12 while enabling air flow to one or more of the air-driven generators in the air-driven generator system 16, although valves may have other types and/or numbers of control positions and/or other manners for controlling the flow may be used.

The power system 22 may comprise a solar power system, the wind power system, and/or an available power grid by way of example, although other types and/or numbers of power systems for obtaining this excess available energy may be used.

The energy management computing device 20 is coupled to the air-driven compressors in the air-driven compressor system 14, the air-driven generators in the air-driven generator system 16, the valves in the hose system 18, and the power system 22 and may execute any number of functions and/or other operations to manage harvesting new energy with excess or unutilized energy, such as solar power, wind power, or excess power from a power grid in different environments, such as a water-based environment as illustrated and described by way of the examples herein. In this particular example, the energy management computing device 20 includes one or more processor(s) 30, a memory 32, and/or a communication interface 34, which are coupled together by a bus or other communication link 36, although the energy management computing device 20 can include other types and/or numbers of elements in other configurations.

The processor(s) 30 of the energy management computing device 20 may execute programmed instructions stored in the memory 32 of the energy management computing device 20 for any number of functions and other operations as illustrated and described by way of the examples herein. The processor(s) 30 of the energy management computing device 20 may include one or more CPUs or general purpose processors with one or more processing cores, for example, although other types of processor(s) can also be used.

The memory 32 of the energy management computing device 20 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 32.

Accordingly, the memory 32 of the energy management computing device 20 can store one or more applications that can include computer executable instructions that, when executed by the energy management computing device 20, cause the energy management computing device 20 to perform actions, such as to manage harvest new energy with excess or unutilized energy, such as solar power, wind power, or excess power from a power grid environment as described and illustrated in the examples herein. The application(s) can be implemented as modules, programmed instructions or components of other applications. Further, the application(s) can be implemented as operating system extensions, module, plugins, or the like.

Even further, the application(s) may be operative in a cloud-based computing environment coupled to the air-driven compressors in the air-driven compressor system 14, the air-driven generators in the air-driven generator system 16, the valves 26 in the hose system 18, and/or the power system 22. The application(s) can be executed within or as virtual machine(s) or virtual server(s) that may be managed in a cloud-based computing environment.

In this particular example, the memory 32 of the energy management computing device 20 may include a power system module 40, an air-driven compressor module 42, an air-driven generator module 44, and a valve control module 46 which may be executed as illustrated and described by way of the examples herein, although the memory 24 can for example include other types and/or numbers of modules, platforms, algorithms, programmed instructions, applications, or databases for implementing examples of this technology.

The power system module 40 may comprise executable instructions that are configured to monitor the power system 22 to manage capture and/or identification of excess or unutilized energy as illustrated and described in greater detail by way of the examples herein, although each of these modules may have executable instructions that are configured to execute other types and/or functions or other operations to facilitate examples of this technology.

Additionally in this example, the air-driven compressor module 42 may comprise executable instructions that are configured to manage operations of one or more air-driven compressors in the air driven compressor system 14 to provide air or other fluids to the container 12 as illustrated and described in greater detail by way of the examples herein, although this module may have executable instructions that are configured to execute other types and/or functions or other operations to facilitate examples of this technology.

The air-driven generator module 44 may comprise executable instructions that are configured to manage operations of one or more of the air-driven generators in the air-driven generator system 16 to harvest energy as illustrated and described in greater detail by way of the examples herein, although this module may have executable instructions that are configured to execute other types and/or functions or other operations to facilitate examples of this technology.

The valve control module 46 may also comprise executable instructions that are configured to manage operations of the valves 26 in the hose system 18 to control the flow of air or other fluids between the air-driven compressors in the air driven compressor system 14, the air-driven generator system 16, and the container 12 as illustrated and described in greater detail by way of the examples herein, although this module may have executable instructions that are configured to execute other types and/or functions or other operations to facilitate examples of this technology.

The communication interface 34 of the energy management computing device 20 operatively couples and communicates between the energy management computing device 20 and the air-driven compressor system 14, the air-driven generators in the air-driven generator system 16, the valves in the hose system 18, and the power system 22, which are all coupled together, although other types and/or numbers of connections and/or communication networks can be used.

While the energy management computing device 20 is illustrated in this example as including a single device, the energy management computing device 20 in other examples can comprise a plurality of devices, such as controllers in the air-driven compressor system 14, the air-driven generator system 16, the valves in the hose system 18, and the power system 22 by way of example. Each of these controllers may have one or more processors, memories and communication interfaces that implement one or more steps of this technology.

Although an exemplary energy management computing device 20 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

The examples illustrated and described herein may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 2:
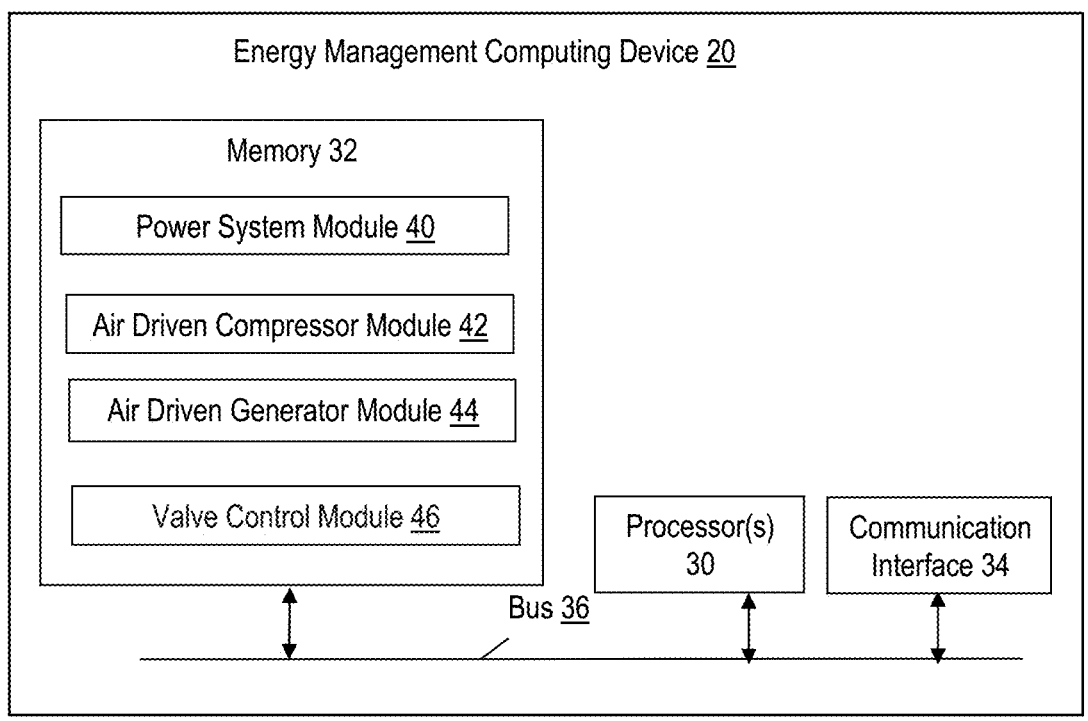
FIG. 2 is a block diagram of the example of the energy control system shown in FIG. 1.
Figure 3:
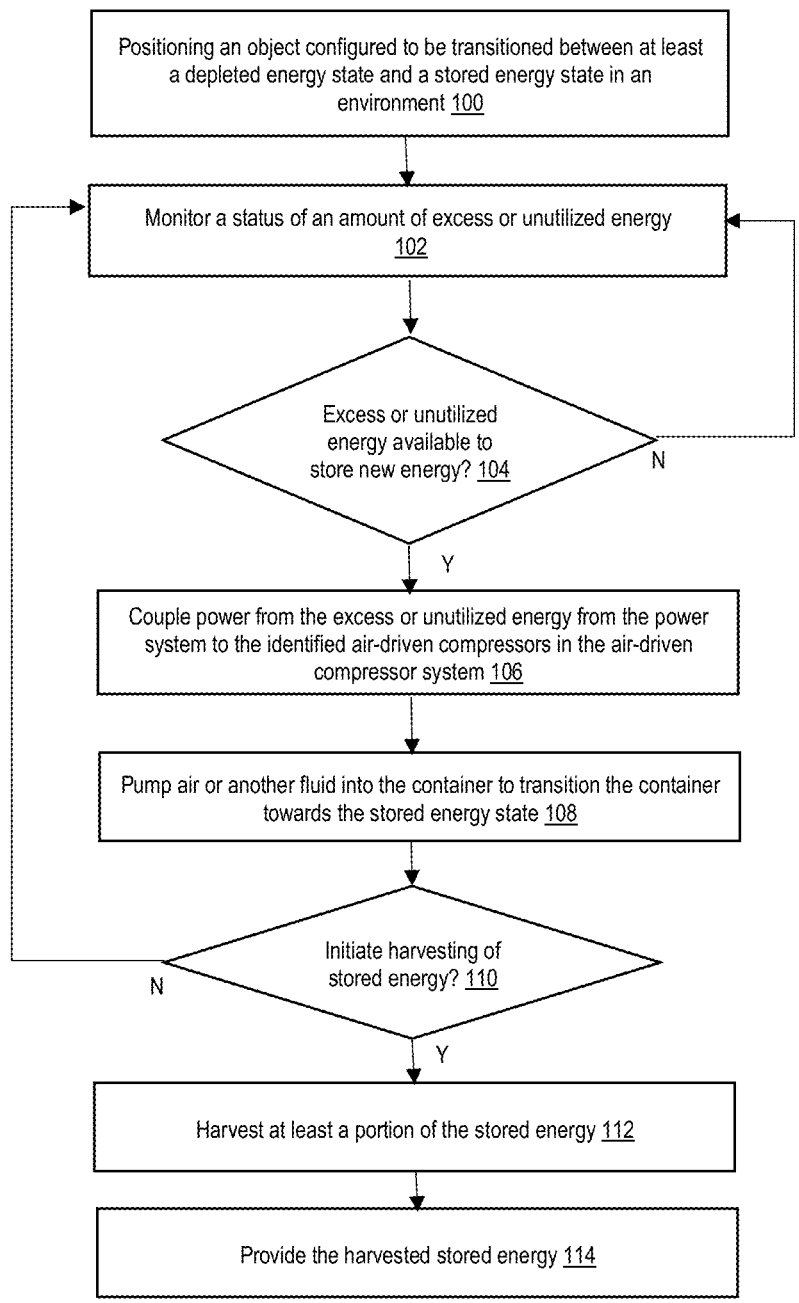
FIG. 3 is a flow chart of an example of a method for harvesting new energy with excess or unutilized energy.

An exemplary method for harvesting new energy with excess or unutilized energy will now be described with reference to FIGS. 1-3. Referring more specifically to FIG. 3, in step 100, in this example the exemplary water-based energy storage and harvesting system 10 is positioned in a water-based environment, although the system may be configured and used in other types of environments. The exemplary water-based energy storage and harvesting system 10 provides an object, such as the container 12 in this example, which is positioned in the water-based environment to be transitioned between a fully depleted energy state and a fully stored energy state. As discussed earlier, in this example in a water-based environment, the container 12 needs to be heavy enough to prevent the container 12 from raising to the surface of the water at any given depth. Further, in this example, the bottom of the container 12 with respect to the water surface is open to allow water in and out as needed as described by way of the examples herein, although the container could have other configurations. In this example in a water-based environment, the fully depleted energy state for the submerged container 12 is a lowest position in the water-based environment when the container 12 is purged of air or other fluids (other than the surrounding water), although other states of the container 12 could be set as the depleted energy state. Additionally, in this example in a water-based environment, the fully stored energy state for the submerged container 12 to store new energy is a highest position in the water-based environment when the container 12 is filled with a maximum amount of air or other fluid while still remaining submerged in the water-based environment, although other states of the container 12 could be set as the stored energy state.

In step 102, the energy management computing device 20 monitors a status of an amount of excess or unutilized energy available from the power system 22, such as a solar power system, wind power system, and/or power grid by way of example, that would otherwise not be utilized and would be wasted and lost, although the energy could be obtained or otherwise provided from other sources. In this example, to monitor a status of an amount of excess or unutilized energy available from the power system 22, the energy management computing device 20 monitors for an available amount of energy in the power system 22 above what is needed for a currently identified energy requirement output for the power system 22, although other approaches for monitoring and/or thresholds could be used.

In step 104, the energy management computing device 20 determines when the power system 22 has a sufficient amount of excess or unutilized energy available to harvest energy. In this example, the energy management computing device 20 makes this determination when a detected available amount of energy from the power source 22 is above an identified current energy requirement output for the power system 22 (that as a result would be wasted and lost) and which available amount is also determined to be sufficient to operate one or more of the air-driven compressors of the air driven compressor system 14 for a determined sufficient period of time to alter a state of the container 12 by way of example, although other manners for making this determination may be used.

If the energy management computing device 20 determines a sufficient amount of excess or unutilized energy is not available, then the No branch is taken back to step 102 to continue to monitor as described above. If in step 102, the energy management computing device 20 determines a sufficient amount of excess or unutilized energy is available, then the Yes branch is taken to step 106.

In step 106, the energy management computing device 20 switches or otherwise couples power from the excess or unutilized energy from the power system 22 to and engages the identified air-driven compressors in the air-driven compressor system 14 depending on the determined amount of available excess or unutilized energy. By way of example, the energy management computing device 20 may couple the available excess or unutilized energy to and engage three of the air-driven compressors in the air-driven compressor system 14.

In step 108, the energy management computing device 20 provides one or more control signals or other programmed instructions to the identified air-driven compressors in the air-driven compressor system 14 to pump air or other fluid into the container 12 and to set the position of the valves 26 of the hose system 18 between the identified air-driven compressors in the air-driven compressor system 14 and the container to allow delivery of the air into the container. Pumping air into the container 12 forces water out and transitions the container towards the stored energy state. Additionally, the energy management computing device 20 provides one or more control signals or other programmed instructions to set the other valves 26 from the other one or more of air-driven compressors in the air-driven compressor system 14 which were not identified and the valves 26 in the hose system 18 between the container 12 and valves 26 between the container 12 and the air-driven generators of the air driven generator system 16 to be closed to restrict or block any flow of air.

In step 110, the energy management computing device 20 determines whether to initiate harvesting of at least a portion of the newly stored energy based on a current state of the container 12 in the water-based environment. In this example, the energy management computing device 20 determined that energy harvesting should be initiated when a position signal of the container 12 in the water-based environment obtained from the position sensor 28 is correlated to a stored energy state for the container which is above a set energy harvesting level threshold (which may be a fully stored energy state or some percentage of a fully stored energy state for the container 12) and a need for the harvested energy is detected, although other manners for determining when to initiate harvesting of energy. By way of example, the energy management computing device 20 may monitor the power system 22 and detect when an available amount of energy from the power source 22 is below an identified current energy requirement output for the power system 22 at which time the stored energy in the exemplary water-based energy storage and harvesting system 10 may be advantageously harvested to meet that deficiency.

If in step 110 the energy management computing device 20 determines not initiate harvesting of energy, then the No branch is taken back to step 102 as described earlier. If in step 110 the energy management computing device 20 determines to initiate harvesting of energy, then the Yes branch is taken to step 112.

In step 112, the energy management computing device 20 the energy management computing device 20 provides one or more control signals or other programmed instructions to set the position of the valves 26 of the hose system 18 between the air-driven compressors in the air-driven compressor system 14 and the container 12 to be closed and to set the position of the valves 26 of the hose system 18 between one or more of the air-driven generators in the air-driven generator system 16 identified to be needed to generate energy based on current state of the container 12 to be open. Additionally, the energy management computing device 20 the energy management computing device 20 provides one or more control signals or other programmed instructions to engage the identified air-driven generators in the air-driven generator system 16 to harvest or otherwise generate energy from this flow of air or other fluid from the container 12 which sinks in the water-based environment and transitions towards the depleted energy state.

In step 114, the energy management computing device 20 the energy management computing device 20 may provide one or more control signals or other programmed instructions to the identified air-driven generators in the air-driven generator system 16 on where to provide or otherwise direct the at least a portion of the harvested stored energy, such as back to a power grid in the power source when an available amount of energy from the power source 22 is detected to be below an identified current energy requirement output for the power system 22.

Examples of this technology will work with various depths of water and the depth only effects the pressure and thus the particular parameters used for systems, devices, components and/or other elements illustrated and described by way of the examples herein. By way of illustration, the following examples of this technology use a depth of 100 meters where pressure in water and thereby in the container 12 is 145 psi. Accordingly, removing each 1,000 cfm at 145 psi from the container 12 will produce 158,834 watts of electricity and based on the dimensions provided in the example earlier herein this container 12 has the capacity to provide 1,588,340 kw of electricity. Using a total of 213 hp compressors pumping 1,000 cfm at 150 psi to fill the container 12 with air will take a total of 16 ten-hour days.

In another example of an energy storage and harvesting system, this alternative example is the same in structure and operation as the one illustrated and described above, except as set forth below. In this alternative example, the air-driven generator system 16 is replaced with a pulley-driven generator system which is coupled by a pulley system to the container 12 and the hose system 18 is not coupled to the generator system. As air or another fluid is released from or injected into the container 12, the container 12 mounted to the pulley system would sink and rise. As the container 12 sinks the attached cable of the pulley system would move driving generators in the pulley-driven generator system to harvest this energy which can be, for example, coupled to a power grid of the power source 22 When there is excess or unutilized energy as described earlier, the compressors in the air-driven compressor system 14 can pump air into the container 12 again to bring it back up to replenish the stored energy.

In an example of another energy harvesting system in a different environment out of water, this additional example is the same in structure and operation as the one illustrated and described above, except as set forth below. Accordingly, in this additional example, the energy harvesting system also has the pulley-driven generator system and the pulley system, but in this example the pulley system has a driving motor coupled to the power system, the container 12 is on an inclined plane in this environment, and this system does not have the air-driven compressor system 14 or hose system.

In this additional example, when excess or unutilized energy is generated by the solar power system and/or wind power system and/or is available from the power grid, then the driving motor is engaged to drive the pulley system which pulls the container 12 or other object up the inclined slope. When energy is required, the control system releases the pulley system to allow the container 12 or other object to slide down the incline so that the pulley-driven generator system harvests stored energy from the pulley systems which moves as the container 12 or other object to slides down the incline. Again the harvested stored energy may be coupled back into the power grid of the power source 12 for use.

Accordingly, as illustrated and described by way of the examples herein this technology provides efficient and effective methods and systems that store new harvestable energy with excess or unutilized energy. Examples of this technology recognize that power systems, such as solar power system, wind power systems, and/or a power grid have excess or unutilized energy above what is required for current energy demands on the power system that would otherwise be wasted and are able to identify and repurpose this excess or unutilized energy into a stored energy state for subsequent harvesting. Additionally, examples of this technology are highly efficient and scalable as well as being adaptable to a number of different types of environments, including water-based environments. Further, examples of this technology provide an effective green energy source which can store energy without batteries or other chemical exchange systems.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for storing new harvestable energy with excess or unutilized energy, the method comprising:
   providing an object that is configured to be transitioned between at least a depleted energy state and a stored energy state;
   utilizing obtained excess or unutilized energy to transition the object to the stored energy state to store energy, wherein the utilizing further comprises:
      determining when an available amount of energy from a power source is above: an identified current energy requirement output for the power system; and an amount to operate a compressor system to alter a state of the object;
      engage the power system to utilize the detected available amount of energy to transition the object to the stored energy state when the determination indicates the available amount of energy is above: the identified current energy requirement output for the power system; and the amount to operate a compressor system to alter a state of the object;
   harvesting at least a portion of the stored energy when the object is released from the stored energy state and transitions towards the depleted energy state, wherein the harvesting further comprises:
      determine when the available amount of energy from the power source is below the identified current energy requirement output and the stored energy state is above a set energy harvesting level threshold;
      engage an energy harvesting system to harvest and provide at least a portion of the stored energy when the determination indicates the available amount of energy from the power source is below the identified current energy requirement output and the stored energy state is above a set energy harvesting level threshold; and
   providing the harvested stored energy.

2. The method of claim 1, wherein the providing the object further comprises:
   providing a container configured to be transitioned between at least the depleted energy state and the stored energy state in a water-based environment based on engagement of a compressor system coupled to the container.

3. The method of claim 2 wherein the transition of the container between at least the depleted energy state and the stored energy state in a water-based environment is based on a change in pressure in the container submerged in the water-based environment.

4. The method of claim 2 wherein the transition of the container between at least the depleted energy state and the stored energy state in a water-based environment is based on a change in position of the container submerged in the water-based environment.

5. The method of claim 2 wherein the utilizing the obtained excess or unutilized energy to transition the object to the stored energy state further comprises:
   engaging the compressor system to pump fluid with a hose system into the container in the water based environment.

6. The method as set forth in claim 5 wherein the harvesting the at least the portion of the stored energy as the object is released and transitions from the stored energy state towards the depleted energy state further comprises:
   releasing fluid from the container which is coupled to and drives a fluid-driven generator system to harvest the stored energy.

7. The method as set forth in claim 5, wherein the harvesting the at least the portion of the stored energy as the object is released and transitions from the stored energy state towards the depleted energy state further comprises:
   releasing fluid from the container which is coupled to a pulley system that drives a pulley-driven generator system to harvest the at least the portion of the stored energy.

8. The method of claim 1, wherein the providing the object further comprises:
   providing an object for slidable movement on an inclined surface to be transitioned between at least the depleted energy state and the stored energy state based on engagement of a pulley system coupled to the object.

9. The method of claim 8 wherein the utilizing the obtained excess or unutilized energy to transition the object to the stored energy state further comprises:
   engaging the pulley system coupled to the object to pull the object up the incline towards the stored energy state.

10. The method as set forth in claim 9 wherein the harvesting the at least the portion of the stored energy as the object is released and transitions from the stored energy state towards the depleted energy state further comprises:
    releasing the pulley system coupled to the object to enable slidable movement of the object on the inclined surface towards the depleted energy state.

11. An energy harvesting system comprising:
    an object configured to be transitioned between at least a depleted energy state and a stored energy state;
    a power system configured to utilize obtained excess or unutilized energy to transition the object to the stored energy state to store energy;
    an energy harvesting system configured to harvest and provide at least a portion of the stored energy when the object is released from the stored energy state and transitions towards the depleted energy state; and
    a management computing device comprising a memory comprising programmed instructions stored in the memory and one or more processors coupled to the memory and configured to execute the programmed instructions stored in the memory to:
       determine when an available amount of energy from the power source is above: an identified current energy requirement output for the power system;
       and an amount to operate a compressor system to alter a state of the object engage the power system to utilize the detected available amount of energy to transition the object to the stored energy state when the determination indicates the available amount of energy is above: the identified current energy requirement output for the power system; and the amount to operate a compressor system to alter a state of the object;

determine when the available amount of energy from the power source is below the identified current energy requirement output and the stored energy state is above a set energy harvesting level threshold;

engage an energy harvesting system to harvest and provide at least a portion of the stored energy when the determination indicates the available amount of energy from the power source is below the identified current energy requirement output and the stored energy state is above a set energy harvesting level threshold.

12. The system of claim 11, wherein the object further comprises a container configured to be transitioned between at least the depleted energy state and the stored energy state in a water-based environment and wherein the system further comprises:

a compressor system coupled to the container control delivery of a fluid to the container.

13. The system of claim 12 wherein the container is further configured to transition between at least the depleted energy state and the stored energy state in a water-based environment based on a change in pressure in the container submerged in the water-based environment.

14. The system of claim 12 wherein the container is further configured to transition between at least the depleted energy state and the stored energy state in a water-based environment based on a change in position of the container submerged in the water-based environment.

15. The system of claim 12 wherein the power system configured to utilize the obtained excess or unutilized energy to transition the object to the stored energy state to engage the compressor system to pump fluid with a hose system into the container in the water based environment.

16. The system as set forth in claim 15 wherein the energy harvesting system is further configured to harvest the at least the portion of the stored energy from the fluid released from the container.

17. The system as set forth in claim 15 wherein the energy harvesting system is further configured to harvest the at least the portion of the stored energy from the container which is coupled to a pulley system that drives a pulley-driven generator system as the fluid is released from the container.

18. The system of claim 11, wherein the object further comprises:

an object configured for slidable movement on an inclined surface to be transitioned between at least the depleted energy state and system further comprises:

a pulley system coupled to the object.

19. The system of claim 18 wherein the power system is further configured to engage the pulley system coupled to the object to pull the object up the incline towards the stored energy state.

20. The system as set forth in claim 19 wherein the energy harvesting system is further configured harvest the at least the portion of the stored energy when the pulley system coupled to the object is released to enable slidable movement of the object on the inclined surface towards the depleted energy state.

* * * * *